Dec. 16, 1930.   H. W. HELMS   1,785,697
FIFTH WHEEL CONSTRUCTION FOR SEMITRAILERS
Filed March 30, 1929   3 Sheets-Sheet 1
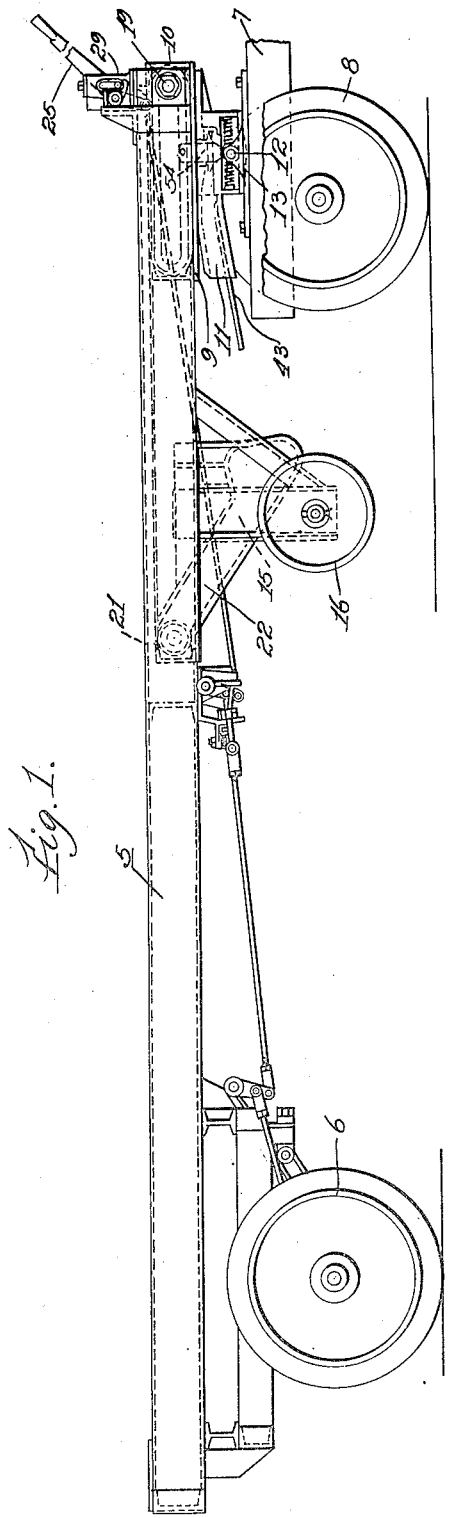
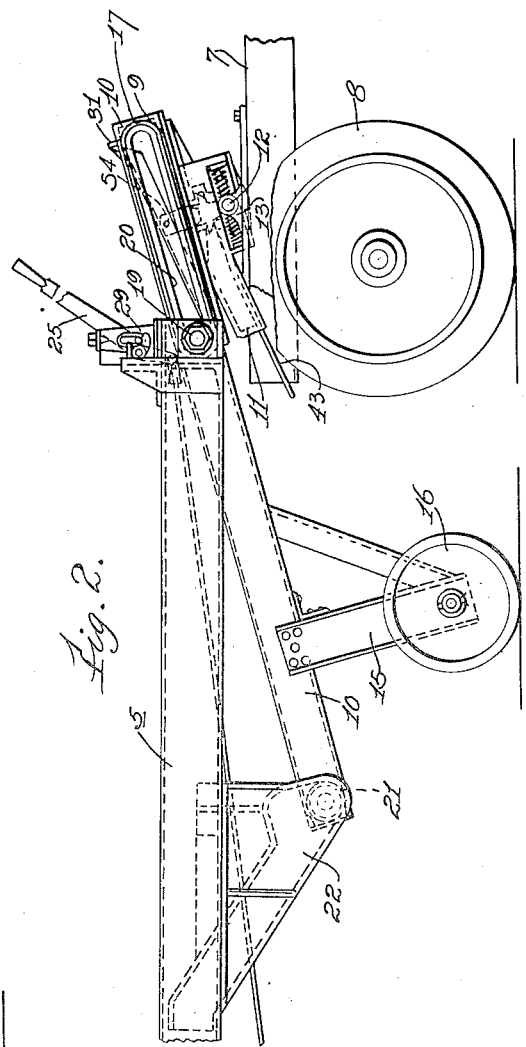
Inventor.
Harry W. Helms
by his Attorneys.

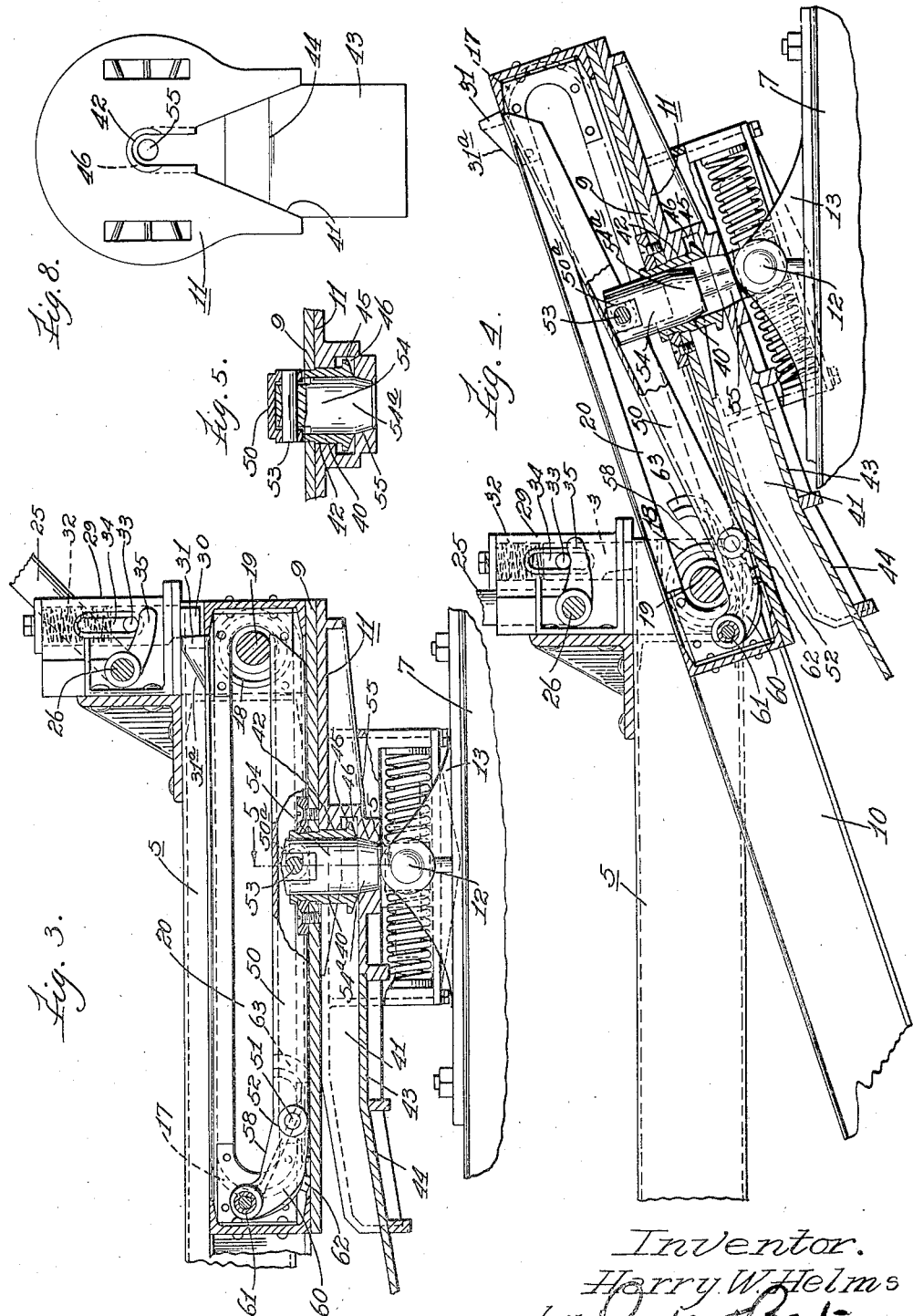

Dec. 16, 1930.   H. W. HELMS   1,785,697
FIFTH WHEEL CONSTRUCTION FOR SEMITRAILERS
Filed March 30, 1929   3 Sheets-Sheet 3

Witness
H. F. McKnight.

Inventor.
Harry W. Helms.
by Burton & Burton
his Attorneys.

Patented Dec. 16, 1930

1,785,697

UNITED STATES PATENT OFFICE

HARRY W. HELMS, OF EDGERTON, WISCONSIN, ASSIGNOR TO HIGHWAY TRAILER COMPANY, OF EDGERTON, WISCONSIN, A CORPORATION OF WISCONSIN

FIFTH-WHEEL CONSTRUCTION FOR SEMITRAILERS

Application filed March 30, 1929. Serial No. 351,143.

This invention relates to combination vehicle units consisting of a tractor and a semitrailer of the type having load supporting members adapted to temporarily support the forward end of the trailer when it is detached from the tractor. More particularly the invention resides in the provision of certain improvements in construction, whereby the coupling and uncoupling of the two vehicle units may be performed positively and speedily with an unusual degree of safety. An object of the present invention is to provide means for preventing shifting of the temporary load supporting members out of ground engaging position except when the fifth wheel members on the tractor and trailer are positively locked together.

Another object of this invention is to provide an improved construction wherein the fifth wheel members on the tractor and trailer are positively held locked together until the temporary load supporting members have been shifted into ground engaging position.

A further object is to provide an improved construction wherein one of the fifth wheel members is mounted for rocking movement during coupling and uncoupling operations, with means responsive to such movement adapted for automatically locking and unlocking said fifth wheel members during coupling and uncoupling operations, respectively. It consists in certain features and elements of construction, in combination, as herein shown and described and as indicated by the claims.

In the drawings:

Figure 1 is a side elevation of a combination vehicle unit embodying the present invention; the forward end of the tractor being broken away and the rear end of the tractor being shown coupled to the trailer.

Figure 2 is a fragmentary side elevation with the temporary load supports in ground engaging position, and with the auxiliary frame extended and engaged with the tractor in position to complete either the coupling or the uncoupling operation.

Figure 3 is an enlarged fragmentary sectional view taken substantially along the longitudinal center line showing the fifth wheel parts of the tractor and trailer in coupled relation.

Figure 4 is an enlarged fragmentary sectional view similar to Fig. 3, but showing the auxiliary frame extended with the fifth wheel members of the tractor and trailer in engagement as in Fig. 2.

Figure 5 is a fragmentary sectional view through the fifth wheel members, showing pin in locking position.

Figure 6 is an enlarged fragmentary view partly in elevation and with parts broken away or in section, taken transversely through the tractor, looking at the front end of the trailer.

Figure 7 is a fragmentary plan view of the front end of the trailer, with parts broken away to show details of construction.

Figure 8 is a plan view of the lower fifth wheel member.

In combination vehicle units of this character the semi-trailer is supported at its front end on a tractor for movement therewith as a complete unit, and is supported on temporary load supports when detached therefrom. The present invention is directed to certain refinements in design and operation of the construction shown in my co-pending application, Serial No. 295,567, filed July 26, 1928.

As indicated in the drawings, the semi-trailer is provided with a main frame, 5, having rear supporting wheels, 6, and the tractor, which is shown fragmentarily and diagrammatically, includes a chassis or frame, 7, partially supported on the rear wheels, 8. A swivel or fifth wheel connection is provided for these vehicles to permit articulation of one with respect to the other when they are coupled together. This swivel connection includes an upper fifth wheel member, 9, which is rigidly secured to the underside of an auxiliary frame, 10, slidably supported by and adapted to be telescoped into and out of the forward end of the trailer frame, 5, into coupling and uncoupling positions, respectively, and a lower fifth wheel member, 11, rockably mounted on a transverse horizontally extending shaft, 12, journaled in bearings, 13, on the tractor frame, 7, to permit said lower fifth wheel member to be tilted fore and aft; normally this lower fifth wheel member assumes a definite rearwardly tilted position as shown in Figs. 2 and 4.

Depending from the auxiliary frame, adjacent the rear end are a pair of transversely spaced legs, 15, at the lower ends of which are journaled ground engaging wheels, 16, adapted to be raised and lowered automatically by the relative telescopic movement of the auxiliary frame during coupling and uncoupling operations respectively. The auxiliary frame is provided on each side adjacent the forward end with longitudinal guide tracks, 17, closed at both ends and slidably supported on rollers, 18, journaled on a transversely extending pivot shaft, 19, which extends through slots, 20, formed both in said tracks and in the auxiliary frame, permitting free unhindered movement of said auxiliary frame in its telescopic movements. This shaft is positioned slightly forward of the main frame proper and serves as the pivot axis about which the auxiliary frame is caused to tilt when extended forwardly during the uncoupling movement. The closed ends of the guide tracks are adapted to come in contact with the pivot rollers, 18, which act as stops for limiting the movement of the auxiliary frame, both in its forwardly extended position and when telescoped into the main frame. The rear end of the auxiliary frame is provided with rollers, 21, positioned in downwardly curved guide tracks, 22, secured to the main frame for positively guiding said auxiliary frame through a definite path of movement.

Thus, due to these inclined guide tracks and the cooperative rollers on the auxiliary frame, said auxiliary frame when extended toward uncoupling position is caused to assume a predetermined upwardly and forwardly inclined angle, while simultaneously and positively carrying the temporary load supports into ground engaging position as shown in Fig. 2, and it is normally retained in such position by the weight of the forward end of the trailer on these supporting legs 15. When the auxiliary frame is so extended, the upper fifth wheel member 9 is tilted at an angle on the trailer substantially the same as that of the lower fifth wheel member, 11, which permits smooth and easy coupling and uncoupling of said members.

It is to be understood that when the trailer is uncoupled from the tractor, the brakes of the trailer should be in applied position, but are automatically released upon completion of the coupling operation as shown and described more fully in detail in my aforesaid application. Before completion of the uncoupling operation, the trailer brakes should be applied, and to insure safety, I prefer to set the brakes manually; for this purpose, a lever, 25, is provided on a transverse rock shaft, 26, at the forward end of the trailer, to which shaft the brake operating linkage is connected by the crank arm 27.

The rock shaft is positioned above and extends parallel to the pivot shaft, 19, and is journaled in bearings, 28, formed integral with the housings 29 spaced transversely of and secured to the front end of the trailer main frame. These housings, 29, are chambered to receive vertically movable locking dogs 30 adapted to cooperate with upstanding lugs or stops 31 on the top of the guide tracks 17 adjacent their forward ends by means of which the auxiliary frame is adapted to be locked into the main frame. These dogs are normally urged downward into locking position by coil springs 32 in said housings, and each is provided with a laterally projecting lug or actuating pin 33 extending outwardly through a slot 34 in said housing and engageable by a lock actuating finger 35 fixed on and rotatable by the rock shaft 26. It will be clear that when the lever 25 is moved to brake applying position, rocking shaft 26, causing the fingers 35 to raise the dogs 30 against the reaction of the springs 32 out of engagement with the stops 31, the auxiliary frame is released for forward movement. When the trailer brakes are automatically released (as above mentioned) due to the telescoping of the auxiliary frame into the main frame during coupling operation, the locking dogs 30 are released and are in position to encounter the inclined surfaces 31$^a$ of said stops, and snap down in front thereof to lock the auxiliary frame in the main frame 5.

Rigidly secured to and projecting from the under side of the upper fifth wheel member on the auxiliary frame of the trailer, and substantially central of the swivelling axis, is an annular sleeve or thimble, 40. The lower fifth wheel member 11 is preferably a casting and is formed with a rearwardly opening V-shaped slot, 41, terminating adjacent the center of the fifth wheel member in a semiannular bearing 42; said slot serving as a guide in directing the sleeve into the bearing for centering the fifth wheel members when the tractor is backed toward the trailer in coupling operation. The bottom of slot 41 adjacent the center is formed as an integral part of the casting, and a connecting plate 43 is provided flush with said bottom portion to complete the bottom for the entire V-slot. The outer or rear end of the plate 43 is bent downwardly as indicated at 44 to facilitate engagement thereof by the sleeve 40, causing it to ride up into the terminal bearing of the slot when the tractor is backed toward the trailer. Said sleeve is formed with an annular flange 45 adapted to engage in a cooperating undercut groove 46 in the lower fifth wheel member whereby said flange, when disposed in said groove, locks the fifth wheel members together against vertical separation.

Disposed in the auxiliary frame is a longitudinally extending operating lever, 50, fulcrumed adjacent its rear end on a pin, 51, carried by brackets, 52, secured to the upper side of the upper fifth wheel member. The operating lever may be of T or inverted U shape cross section, (the latter being herein illustrated) and it is pivotally connected to said lever by a pin 53; forwardly of the fulcrum is a king pin or plunger 54 reciprocably movable in the sleeve 40 by said lever into and out of engagement with the lower fifth wheel member 11. When the lever is in the position shown in Fig. 3, the tapered lower end 54$^a$ of the king pin is projected into a correspondingly tapered seat 55 formed concentrically of the bearing 42 in the bottom terminal portion of the V-slot, whereby the fifth wheel members are locked together against horizontal separation. The tapered end of the pin 54 and its seat 55 facilitates registration and entry of said pin into the seat.

The upper surface of the operating lever is in sliding contact with the under side of the pivot shaft 19 which is fixed on the main frame, and when the auxiliary frame is telescoped into the main frame as in Fig. 3, the lever is engaged by said shaft adjacent the outer end in which position it positively holds the king pin 54 down in operative engagement in its seat in the lower fifth wheel member.

However, when the auxiliary frame is extended forwardly in the uncoupling operation, the lever slides along under the pivot shaft, and just about the time that the temporary load supporting wheels are brought into ground engaging position, the auxiliary frame will be extended so that the shaft 19 commences acting on the upwardly inclined cam surface 58 of the lever beyond its fulcrum 51, swinging the forward end of the lever upwardly (as in Fig. 4) and withdrawing the pin 54 out of engagement with its seat in the lower fifth wheel member thereby releasing the fifth wheel members for completion of the uncoupling operation. And conversely, during the coupling operation, the initial portion of the telescoping movement of the auxiliary frame, shifts the cam surface 58 of the operating lever out of engagement with the pivot shaft 19, which permits the lever 50 to drop the king pin downwardly into its seat in the lower fifth wheel member, thus locking said fifth wheel members together, before the temporary load supports are raised off the ground.

The lever is formed with an elongated slot 50$^a$ in which is seated the pivot 53 so as to avoid binding or cramping of the sliding king pin as it is reciprocated in the sleeve 40. To insure that the fifth wheel members are locked together before the auxiliary frame telescopes into the main frame and shifts the load supporting wheels wholly out of operative position, I provide a pair of locking members, 60, pivotally connected by a pin, 61, on opposite sides of the rear end of the operating lever. These locking members, are provided with lugs 62 which are slidably engageable with the upper surface of the upper fifth wheel member, and have their forward ends formed as upturned hooks, 63, extending forwardly of the fulcrum 51. When the vehicle units are coupled, the hooked ends 63 lie slightly below the top of the operating lever so as to clear the shaft 19 during forward extension of the auxiliary frame. As may be seen from Figs. 3 and 4, the engagement of the lever cam surface 58 beyond the fulcrum 51 by the shaft 19 caused during the forward extension of the auxiliary frame in uncoupling movement, swings the locking members 60 about the pivot 61 so as to project the hook portions 63 upwardly into the forward path of travel of the shaft 19 by making the lug portions 62 of said locking members serve as sliding or shifting fulcrums.

During the telescoping operation, the king pin is required to be positively engaged in its seat in the lower fifth wheel member in locking position; otherwise the auxiliary frame cannot be returned into the main frame, because as long as the pin 54 is in contact with the bottom of the V-slot, it will be held up in sleeve 40, thus holding the lever 50 inclined in its inoperative position with the hook portions 63 of the locking members 60 abutting the pivot shaft 19 and preventing further movement in that direction, until the sleeve, 40, is seated in place to permit the king pin, 54, and the lever, 50, to drop. If the hooks 63 are positioned to arrest the rearward telescoping movement of the auxiliary frame, this will take place prior to the shifting of the temporary load supports out of ground engaging position; thus insuring that the front end of the trailer will be positively supported independently of the tractor until the fifth wheel members are properly engaged and locked together.

The construction is of relatively simple design with few working parts; it is strong and durable and capable of withstanding the rough abuse usually accorded such vehicles. Furthermore, the operation of the mechanism is substantially automatic, and its arrangement is such as to permit speedy coupling and uncoupling action with the utmost safety and positiveness of operation.

I claim:

1. The method of coupling a tractor and semi-trailer which consists in temporarily supporting the forward end of the trailer with the upper fifth wheel member tilted forwardly and upwardly; moving the tractor frame thereunder with its lower fifth wheel member tilted at a corresponding angle for engaging the upper fifth wheel member, and then moving both of said fifth wheel members to a substantially horizontal position, such movement simultaneously and automatically locking the fifth wheel members together.

2. The method of coupling a tractor and semi-trailer which consists in temporarily supporting the forward end of the trailer with the upper fifth wheel member tilted forwardly and upwardly; then moving the tractor frame thereunder with its lower fifth wheel member tilted in cooperating relation for engaging the upper fifth wheel member, moving both of said fifth wheel members to a substantially horizontal position and utilizing such movement for simultaneously and automatically locking the fifth wheel members together and rendering the temporary support inoperative.

3. The method of coupling and uncoupling a tractor and semi-trailer which consists in temporarily supporting the forward end of the trailer with its upper fifth wheel member disposed in an upwardly and forwardly inclined position, then moving the tractor toward the trailer with the lower fifth wheel member tilted in co-operating relation for engaging the upper fifth wheel member, further movement causing the fifth wheel members to assume a substantially horizontal position and simultaneously and automatically lock together; the uncoupling operation consisting in first tilting both of the fifth wheel members to incline downward rearwardly, and then utilizing this movement to simultaneously and automatically unlock said fifth wheel members to permit separation thereof to complete the uncoupling operation.

4. The method of coupling and uncoupling a tractor and semi-trailer which consists in temporarily supporting the forward end of the trailer with the upper fifth wheel member disposed in an upwardly and forwardly inclined position, then moving the tractor toward the trailer with the lower fifth wheel member tilted in co-operating relation for engaging the upper fifth wheel member, further movement causing said fifth wheel members to assume a substantially horizontal position and simultaneously and automatically lock together, and also carrying the supporting means out of ground-engaging position; the uncoupling movement consisting in tilting both the fifth wheel members to incline downward rearwardly, such movement simultaneously and automatically unlocking the fifth wheel members and moving the supporting means into ground-engaging position, whereby said fifth wheel members are permitted to be separated for completing the uncoupling operation 5. In combination with a semi-trailer and a tractor, a fifth wheel swivelly supporting one end of the trailer on the tractor when coupled thereto, said fifth wheel comprising an upper member tiltably supported on the trailer and a cooperating lower member rockably carried on the tractor, said upper member being tilted upward and forward when in uncoupling position and adapted to be moved to horizontal position by the coupling operation of the tractor and trailer, and means responsive to such rocking movement of the upper fifth wheel member for automatically locking said fifth wheel members together.

6. In combination with a tractor, a semi-trailer having a main frame, a fifth wheel providing a turn-table connection between said tractor and trailer, said fifth wheel including a lower member carried on the tractor and a co-operating upper member tiltably mounted on the trailer, said upper member being adapted to assume an upwardly and forwardly inclined position during the separation of the tractor and trailer, and adapted to be shifted to horizontal position by the coupling action of said tractor and trailer, and means responsive to such movement of the upper fifth wheel member for automatically locking or releasing said fifth wheel members during the coupling or uncoupling operations respectively.

7. In combination a tractor, a semi-trailer having a main frame and an auxiliary frame movably supported thereby, a fifth wheel comprising a two-part swivel, one part being attached to the tractor and the other part carried by the auxiliary frame, said auxiliary frame and swivel part being shiftable into an upwardly tilted position during the uncoupling of the tractor from the trailer and being adapted for return movement when the tractor is backed toward the trailer, an operating lever pivotally connected to the auxiliary frame, a king pin carried by the lever, said lever and main frame having cooperating features whereby said lever is swung about its fulcrum when said auxiliary frame is moved relative to the main frame during coupling and uncoupling operations, such movement of the lever causing said king pin to be moved into and out of engagement respectively with the lower swivel part.

8. In combination a tractor, a semi-trailer having a main frame and an auxiliary frame slidably supported thereby, a fifth wheel comprising a two-part swivel, one part being attached to the tractor and the other part carried by the auxiliary frame, said auxiliary frame and swivel part being slidable forwardly into an upwardly tilted position during the uncoupling of the tractor from the trailer, and being adapted for return movement when the tractor is backed toward the trailer, an operating lever fulcrumed on the auxiliary frame, a king pin pivotally supported by the lever and detachably engageable with the lower swivel part, said lever having a cam surface engageable by the main frame when the auxiliary frame is slidably moved relative thereto, such movement of the lever causing the king pin to be shifted into or out of engagement with the lower swivel part.

9. In combination a tractor, a semi-trailer having a main frame and an auxiliary frame slidably supported thereby, a fifth wheel comprising a two-part swivel, one part being attached to the tractor and the other part carried by the auxiliary frame, said auxiliary frame and swivel part being slidable forwardly into an upwardly tilted position during the uncoupling of the tractor from the trailer, and being adapted for return movement when the tractor is backed toward the trailer, an operating lever fulcrumed on the auxiliary frame, a king pin pivotally supported by the lever and detachably engageable with the lower swivel part, said lever having a cam surface engageable by the main frame when the auxiliary frame is slidably moved relative thereto, such movement of the lever causing the king pin to be shifted into or out of engagement with the lower swivel part and means carried by said upper swivel part for guiding the king pin throughout its range of movement.

10. In combination with a tractor, a semi-trailer having a main frame and an auxiliary frame movably supported thereby, a fifth wheel comprising a two-part swivel, one part being attached to the tractor and the other part carried by the auxiliary frame, said auxiliary frame and swivel part being shiftable into an upwardly tilted position during the uncoupling of the tractor from the trailer, and being adapted for return movement when the tractor is backed toward the trailer, said means including an operating lever fulcrumed on the auxiliary frame, a king pin pivotally supported by the lever and detachably engageable with the lower swivel part, said lever having a cam surface engageable by the main frame when the auxiliary frame is moved relative thereto, such movement of the lever causing the king pin to be shifted into or out of engagement with the lower swivel part, and means carried by said upper swivel part for guiding the king pin throughout its range of movement, said guide means being formed to engage under a rigid portion of the lower swivel part during coupling operation for preventing vertical separation of said swivel parts.

11. In combination, a tractor, a semi-trailer having a main frame, an auxiliary frame slidably supported thereby, a fifth wheel including a lower member tiltably mounted on the tractor and an upper member carried by the auxiliary frame and movable therewith into a forwardly extended upwardly inclined position during uncoupling of the tractor and trailer, and adapted to be returned with respect to the main frame when the tractor is backed toward the trailer in coupling operation, load supporting members connected to the auxiliary frame and movable therewith into and out of ground engaging position during uncoupling and coupling operations respectively, means responsive to such movement of the auxiliary frame for unlocking and locking the fifth wheel members together during uncoupling and coupling operations respectively, and means adapted to prevent return movement of said auxiliary frame and shifting of said load supporting members out of ground engaging position, until said fifth wheel members are positively locked together.

12. In combination, a tractor, a semi-trailer having a main frame, an auxiliary frame slidably supported thereby, a fifth wheel including a lower member tiltably mounted on the tractor and an upper member carried by the auxiliary frame and movable therewith into a forwardly extended upwardly inclined position during uncoupling of the tractor and trailer, and adapted to be returned with respect to the main frame when the tractor is backed toward the trailer in coupling operation, load supporting members connected to the auxiliary frame and movable therewith into and out of ground engaging position during uncoupling and coupling operations respectively, and means responsive to such movement of the auxiliary frame for unlocking and locking the fifth wheel members together during uncoupling and coupling operations respectively, said means being adapted to positively maintain said fifth wheel members locked together until the load supporting members are shifted into ground engaging position during the uncoupling operation.

13. In combination, a tractor, a semi-trailer having a main frame, an auxiliary frame longitudinally slidable thereon, a fifth wheel including a lower member tiltably supported on the tractor and an upper member carried by the auxiliary frame and movable therewith into a forwardly extended, upwardly inclined position during uncoupling of the tractor and trailer, and adapted to be returned by backing the tractor toward the trailer in the coupling operation, and means responsive to such movement for automatically unlocking and locking said fifth wheel members together during uncoupling and coupling operations respectively; said means including a longitudinally extending operating lever fulcrumed on the auxiliary frame and having its upper surface formed as a cam, a sleeve fixedly secured to said upper member and adapted to engage in the closed end of a rearwardly open slot in said lower member, when said fifth wheel members are engaged, said sleeve having an annular flange adapted to engage in a cooperating undercut groove formed in said lower member at the closed end of said slot, whereby to prevent vertical separation of said fifth wheel members, a king pin reciprocably mounted in said sleeve and pivoted to said lever, together with a cross member on the main frame engageable with the cam surface of the lever for swinging said lever about its fulcrum thereby moving said pin into or out of engagement with a seat formed in the lower fifth wheel member, said pin when thus engaged being adapted to prevent lateral separation of the fifth wheel members; and a locking member pivoted adjacent the end of the lever beyond the fulcrum, the forward end of said locking member being of hook formation adapted to be swung upwardly by the action of the main frame cross member on the lever when the auxiliary frame is extended during uncoupling operation, whereby said hook end of the locking member is positioned to encounter said cross member and prevent return movement of the auxiliary frame unless said lever is permitted to move downwardly and project the king pin into its seat in the lower fifth wheel member.

14. In combination, a tractor, a semi-trailer having a main frame, an auxiliary frame longitudinally slidable thereon, a fifth wheel including a lower member tiltably supported on the tractor and an upper member carried by the auxiliary frame and movable therewith into a forwardly extended, upwardly inclined position during uncoupling of the tractor and trailer, and adapted to be returned by backing the tractor toward the trailer in the coupling operation, and means responsive to such movement for automatically unlocking and locking said fifth wheel members together during uncoupling and coupling operations respectively; said means including a longitudinally extending operating lever fulcrumed on the auxiliary frame and having its upper surface formed as a cam, a sleeve fixedly secured to said upper member and adapted to engage in the closed end of a rearwardly open slot in said lower member, when said fifth wheel members are engaged, said sleeve having an annular flange adapted to engage in a co-operating undercut groove formed in said lower member at the closed end of said slot, whereby to prevent vertical separation of said fifth wheel members, a king pin reciprocably mounted in said sleeve and pivoted to said lever, together with a cross member on the main frame engageable with the cam surface of the lever for swinging said lever about its fulcrum, thereby moving said pin into or out of engagement with a seat formed in the lower fifth wheel member, said pin when thus engaged being adapted to prevent lateral separation of the fifth wheel members.

15. In the combination defined in claim 14, means adapted to normally prevent return movement of the auxiliary frame and upper fifth wheel member, during coupling operation, until said lower member is positioned with its seat in registration with the king pin.

16. In the combination defined in claim 14, means adapted to normally prevent return movement of the auxiliary frame and upper fifth wheel member during coupling operation, until said lower member is positioned with its seat in registration with the king pin, said means including a locking member pivoted to the lever rearwardly of its fulcrum and adapted to be moved into operative position by said lever when the auxiliary frame and upper fifth wheel member are moved to uncoupling position.

17. In the combination defined in claim 14, means adapted to normally prevent return movement of the auxiliary frame and upper fifth wheel member, during coupling operation, until said lower member is positioned with its seat in registration with the king pin, said means including a locking member pivoted adjacent the end of the lever beyond the fulcrum, the forward end of said locking member being of hook formation adapted to be swung upwardly by the action of the main frame cross member on the lever when the auxiliary frame is extended during uncoupling operation, whereby said hook end of the locking member is positioned to encounter said cross member and prevent return movement of the auxiliary frame unless said lever is permitted to move downwardly and project the king pin into its seat in the lower fifth wheel member.

18. In combination, a tractor and a semi-trailer having a main frame and auxiliary frame longitudinally slidable thereon, a fifth wheel including a lower member tiltably supported on the tractor, and an upper member carried by the auxiliary frame and movable therewith into a forwardly extended upwardly inclined position during uncoupling of the tractor and trailer and adapted to be returned by backing the tractor toward the trailer in the coupling operation, means responsive to such movement for automatically locking and unlocking said fifth wheel members together, during coupling and uncoupling operations respectively; said means including a longitudinally extending operating lever fulcrumed on the auxiliary frame and having its upper surface formed as a cam, a king pin connected to said lever, together with a cross member on the main frame engageable with the cam surface of the lever for swinging said lever about its fulcrum, thereby moving said king pin into or out of engagement with a seat formed in the lower fifth wheel member, said pin when thus engaged being adapted to prevent horizontal separation of the fifth wheel members, and a locking member pivoted adjacent the end of the lever beyond the fulcrum, the forward end of said locking member being of hook formation adapted to be swung upwardly by the action of the main frame cross member on the lever when the auxiliary frame is extended during uncoupling operation, whereby said hook end of the locking member is positioned to encounter said cross member and prevent the return movement of the auxiliary frame unless said lever is permitted to move downwardly and project the king pin into its seat in the lower fifth wheel member, a portion of said locking member intermediate the pivot and the hook end being in sliding contact with the auxiliary frame and adapted to serve as a shifting fulcrum for swinging the hook end upwardly into operative position.

19. In combination with a semi-trailer and a tractor, a fifth wheel swivelly supporting one end of the trailer on the tractor when coupled thereto, said fifth wheel comprising an upper member tiltably supported on the trailer, and a co-operating lower member carried on the tractor, said upper member being tilted upward and forward when in coupling position and adapted to be returned to horizontal position by the coupling operation of the tractor and trailer, means responsive to such return movement of the upper fifth wheel member for automatically locking said fifth wheel members together, and means normally preventing the said return movement of the auxiliary frame and upper fifth wheel member until both of said fifth wheel members are in swivelling registration with each other.

20. In combination, a tractor, a semi-trailer, a fifth wheel comprising a two-part swivel, including a lower part attached to the tractor and an upper part carried on the trailer, means including fixed elements on said upper and lower parts respectively adapted to prevent vertical separation thereof, temporary load-supporting means on the trailer movable into and out of operative position, and locking means on the trailer interconnected with said load-supporting means for operation therewith, and adapted to lock the swivel parts against horizontal separation.

21. In combination, a tractor, a semi-trailer having a main frame, a fifth wheel comprising an upper member carried on the trailer frame and a lower member mounted on the tractor, a sleeve fixedly secured to said upper fifth wheel member and adapted to be swivelly engaged in the closed end of a rearwardly open slot in said lower fifth wheel member, said sleeve being provided with a flange adapted to co-operate with an undercut groove formed in the lower member at said closed end of the slot for preventing vertical separation of the fifth wheel members, and a king pin slidably mounted in said sleeve and adapted to be extended into the lower fifth wheel member for locking said members against horizontal separation.

22. In the combination defined in claim 21, means carried on the trailer automatically operable by the relative movements of the tractor and trailer during coupling and uncoupling operations for axially shifting said king pin into and out of operative locking position with the lower fifth wheel member, respectively.

23. In the combination defined in claim 21, the lower end of said king pin being tapered for engaging a tapered seat formed in said lower fifth wheel member.

HARRY W. HELMS.